US012334775B2

(12) United States Patent
Jia et al.

(10) Patent No.: US 12,334,775 B2
(45) Date of Patent: Jun. 17, 2025

(54) POWER SUPPLY SYSTEM AND CONTROL METHOD

(71) Applicant: Huawei Digital Power Technologies Co., Ltd., Shenzhen (CN)

(72) Inventors: Maoping Jia, Xi'an (CN); Mingming Pu, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 114 days.

(21) Appl. No.: 18/307,706

(22) Filed: Apr. 26, 2023

(65) Prior Publication Data

US 2023/0261512 A1    Aug. 17, 2023

Related U.S. Application Data

(63) Continuation of application No. PCT/CN2020/124243, filed on Oct. 28, 2020.

(51) Int. Cl.
*H02J 9/06* (2006.01)
(52) U.S. Cl.
CPC .................................. *H02J 9/068* (2020.01)
(58) Field of Classification Search
None
See application file for complete search history.

(56) References Cited

U.S. PATENT DOCUMENTS 5,581,133 A     12/1996 Smith et al.
6,501,196 B1 *  12/2002 Lo ............................. H02J 9/06
                                                   307/64

(Continued)

FOREIGN PATENT DOCUMENTS

CN         2741256 Y     11/2005
CN       201733129 U      2/2011
(Continued)

OTHER PUBLICATIONS

English machine translation of CN106059055A, published Oct. 26, 2016 (Year: 2016).*
English machine translation of CN106972623A, published Jul. 21, 2017 (Year: 2017).*

(Continued)

*Primary Examiner* — Rexford N Barnie
*Assistant Examiner* — David A Shiao
(74) *Attorney, Agent, or Firm* — WOMBLE BOND DICKINSON (US) LLP

(57) ABSTRACT

A power supply system is described. The power supply system can include an active power contactor, a standby power contactor, an auxiliary power contactor, a control switch, and a controller. The active power contactor is connected in series in a path of a main power supply circuit, and the standby power contactor is connected in series in a path of a standby power supply circuit. The active power contactor and the standby power contactor are interlocked through the auxiliary power contactor. The auxiliary power contactor and the control switch are connected in series. The controller is configured to when the main power supply circuit is abnormal, control the control switch to change a status of the auxiliary power contactor, to switch to the standby power supply circuit, or control the control switch to change the status of the auxiliary power contactor, to switch to the main power supply circuit.

17 Claims, 5 Drawing Sheets

(56) References Cited

U.S. PATENT DOCUMENTS

| | | | |
|---|---|---|---|
| 2014/0203648 A1* | 7/2014 | Siglock | H02J 9/061 |
| | | | 307/64 |
| 2015/0115745 A1 | 4/2015 | Wang et al. | |
| 2017/0254852 A1* | 9/2017 | Gould | H02J 9/061 |

FOREIGN PATENT DOCUMENTS

| | | | | | |
|---|---|---|---|---|---|
| CN | 201750210 | U | | 2/2011 | |
| CN | 102222969 | A | | 10/2011 | |
| CN | 202395514 | U | | 8/2012 | |
| CN | 106059055 | A | | 10/2016 | |
| CN | 106130165 | A | * | 11/2016 | H02J 9/061 |
| CN | 206023622 | U | | 3/2017 | |
| CN | 106972623 | A | * | 7/2017 | H02J 9/061 |
| CN | 107017699 | A | * | 8/2017 | H02J 9/06 |
| CN | 107069935 | A | | 8/2017 | |
| CN | 108539846 | A | * | 9/2018 | |
| CN | 208890468 | U | | 5/2019 | |
| CN | 209298974 | U | | 8/2019 | |
| CN | 110829583 | A | * | 2/2020 | G01R 31/40 |
| CN | 211790926 | U | | 10/2020 | |
| JP | 2019161949 | A | | 9/2019 | |

OTHER PUBLICATIONS

English machine translation of CN107017699A, published Aug. 4, 2017 (Year: 2017).*
English machine translation of CN108539846A, published Sep. 14, 2018 (Year: 2018).*

* cited by examiner

POWER SUPPLY SYSTEM AND CONTROL METHOD

CROSS-REFERENCE TO RELATED APPLICATIONS

This application is a continuation of International Application No. PCT/CN2020/124243, filed on Oct. 28, 2020, the disclosure of which is hereby incorporated by reference in its entirety.

TECHNICAL FIELD

This application relates to the field of alternating current power supply technologies, and in particular, to a power supply system and a control method.

BACKGROUND

Currently, to implement uninterruptible power supply to an electric device, dual power supply is usually used. That is, a main power supply circuit and a standby power supply circuit are included in the dual power supply. The dual power supply may use an interlocking mechanism, so that one circuit supplies power to the electric device at a time. Generally, when the main power supply circuit is powered on, the main power supply circuit supplies power. When the main power supply circuit is powered down and the standby power supply circuit is powered on, the standby power supply circuit is switched to for power supply. In a general design, when both the main power supply circuit and the standby power supply circuit are powered on, the main power supply circuit preferentially supplies power.

However, in a dual power supply solution provided in the conventional technology, another path is switched to for power supply only when the main power supply circuit or the standby power supply circuit is powered down, and power supply switching cannot be implemented when another exception occurs.

SUMMARY

This application provides a power supply system and a control method. When a main power supply circuit or a standby power supply circuit is powered down, another path is switched to supply power. In addition, when another exception occurs in one power supply circuit, another path is switched to supply power.

An embodiment of this application provides a power supply system. In addition to an active power contactor, a standby power contactor, and an auxiliary power contactor, the power supply system further includes a control switch and a controller. The active power contactor is connected in series in a path of a main power supply circuit, and is configured to control connection and disconnection of the main power supply circuit. The standby power contactor is connected in series in a path of a standby power supply circuit, and is configured to control connection and disconnection of the standby power supply circuit. The active power contactor and the standby power contactor are interlocked through the auxiliary power contactor. Interlocking means that only one power supply supplies power at a time. That is, when a main contact corresponding to the active power contactor is turned on, a main contact corresponding to the standby power contactor is turned off. Similarly, when the main contact corresponding to the active power contactor is turned off, the main contact corresponding to the standby power contactor is turned on. In some embodiments, interlocking is implemented by connecting, in series, a switch of the auxiliary power contactor to a coil of the active power contactor and a coil of the standby power contactor. When the auxiliary power contactor acts, power supply to the coil of the active power contactor and power supply to the coil of the standby power contactor are affected, and then the main contact of the active power contactor and the main contact of the standby power contactor are affected. Because the auxiliary power contactor is connected in series to the control switch, and in some embodiments, the coil of the auxiliary power contactor may be connected in series to the control switch, when the control switch acts, power supply to the coil of the auxiliary power contactor is affected. For example, when the control switch is turned off, the coil of the auxiliary power contactor is powered off; or when the control switch is turned on, the coil of the auxiliary power contactor is powered on. In some embodiments, when the main power supply circuit is abnormal, the controller controls the control switch to change a status of the auxiliary power contactor, to switch to the standby power supply circuit to supply power; or when the standby power supply circuit is abnormal, the controller controls the control switch to change the status of the auxiliary power contactor, to switch to the main power supply circuit to supply power, so as to implement switching of power supply circuit and implement power supply backup of the power supply system.

According to the power supply system provided in this embodiment of this application, the control switch and the controller are added to the power supply system, and the control switch is connected in series to the auxiliary power contactor. Consequently, the power supply path of the auxiliary power contactor is directly affected when the control switch acts. Generally, the power supply to the coil of the auxiliary power contactor is provided by the main power supply circuit. For example, in a three-phase power supply system, the coil of the auxiliary power contactor is connected between any two phases of the three-phase power supply system. In addition, when the auxiliary power contactor acts, interlocking between the main power supply circuit and the standby power supply circuit may be implemented. Therefore, when the exception occurs in the main power supply circuit, the controller controls the control switch to act, to switch to the standby power supply circuit to supply power; and when the exception occurs in the standby power supply circuit, the controller controls the control switch to act, to switch to the main power supply circuit to supply power. According to the technical solutions provided in embodiments of this application, when at least one of the foregoing exceptions occurs in the power supply system, the power supply system may automatically switch to another normal power supply circuit to supply power, so as to ensure normal power supply to a load, so that the load works normally. In this way, a derivative hazard caused by that an abnormal power supply circuit still supplies power can be avoided, and a range of the exception will not be expanded.

In some embodiments, the auxiliary power contactor includes a normally open contact and a normally closed contact. The normally open contact of the auxiliary power contactor and a normally closed contact of the standby power contactor are connected in series, and the normally open contact of the auxiliary power contactor and a coil of the active power contactor are connected in series. The normally closed contact of the auxiliary power contactor and a normally closed contact of the active power contactor are connected in series, and the normally closed contact of the auxiliary power contactor and a coil of the standby power contactor are connected in series. The control switch is a normally closed switch. A coil of the auxiliary power contactor is connected in series to the control switch. When the main power supply circuit is abnormal, the controller controls the control switch to turn off, so that the coil of the auxiliary power contactor is powered off, the corresponding normally closed contact of the auxiliary power contactor is normally closed, and the normally open contact of the auxiliary power contactor is turned off. With reference to a connection relationship between the normally closed contact and the normally open contact of the auxiliary power contactor described above, it may be learned that, when statuses of the normally closed contact and the normally open contact of the auxiliary power contactor are changed, the controller may switch to the standby power supply circuit. Similarly, when the standby power supply circuit is abnormal, the controller controls the control switch to turn on, and the coil of the auxiliary power contactor is powered on. Correspondingly, the normally closed contact of the auxiliary power contactor is turned off, and the normally open contact of the auxiliary power contactor is turned on. With reference to the connection relationship between the normally closed contact and the normally open contact of the auxiliary power contactor described above, it may be learned that, when statuses of the normally closed contact and the normally open contact of the auxiliary power contactor are changed, the controller may switch to the main power supply circuit.

In some embodiments, to detect various exceptions of the main power supply circuit, the power supply system may further include a main power supply circuit detection circuit, configured to detect a main circuit voltage of the main power supply circuit, and send the detected main circuit voltage to the controller. When determining, based on the main circuit voltage, that overvoltage or undervoltage occurs in the main power supply circuit, the controller determines that the main power supply circuit is abnormal, and controls the control switch to turn off, that is, switch to the standby power supply circuit to supply power. The overvoltage means that a voltage is excessively high and exceeds a preset normal range. The undervoltage means that the voltage is extremely low and is lower than the preset normal range.

In some embodiments, when the power supply system is a three-phase alternating current power supply system and has no N wire, the main power supply circuit detection circuit is further configured to: when determining, based on the main circuit voltage, that a phase loss occurs in the main power supply circuit, send phase loss information of the main power supply circuit to the controller. The controller is further configured to control the control switch to turn off in response to the phase loss information of the main power supply circuit. That is, the controller controls the control switch to turn off after receiving the phase loss information of the main power supply circuit sent by the main power supply circuit detection circuit. For example, the main power supply circuit detection circuit may send the phase loss information of the main power supply circuit to the controller as a signal, for example, a high level, indicating that the phase loss occurs on the main power supply circuit.

For a three-phase alternating current power supply system without an N wire, a phase loss is determined by the main power supply circuit detection circuit. For a three-phase alternating current power supply system with an N wire, a phase loss needs to be determined by the controller. That is, when the power supply system is a three-phase alternating current power supply system and has the N wire, the main power supply circuit detection circuit is further configured to detect a main circuit voltage phase of the main power supply circuit, and send the main circuit voltage phase to the controller. The controller is further configured to determine, based on the main circuit voltage and the main circuit voltage phase, that the phase loss occurs in the main power supply circuit, and control the control switch to turn off.

In some embodiments, if a frequency of the power supply system is excessive or is extremely low, power supply quality of the power supply is affected. In serious cases, the load may not work normally. Therefore, the main power supply circuit detection circuit is further configured to obtain a main circuit frequency based on the main circuit voltage, and send the main circuit frequency to the controller. The controller determines whether the main circuit frequency is normal. That is, when determining, based on the main circuit frequency, that a frequency exception occurs on the main power supply circuit, the controller controls the control switch to turn off, and then switch to the standby power supply to supply power.

In some embodiments, a phase reversal that occurs in the power supply system is also a type of power supply exception. Consequently, the main power supply circuit detection circuit is further configured to obtain the main circuit voltage phase, and send the main circuit voltage phase to the controller. The controller is further configured to: when determining, based on the main circuit voltage phase, that the phase reversal occurs in the main power supply circuit, control the control switch to turn off, and then switch to the standby power supply circuit to supply power.

The foregoing describes detection of various exceptions of the main power supply circuit by using the main power supply detection circuit. The following describes detection of various exceptions of the standby power supply circuit by using a standby power supply circuit detection circuit.

That is, the power supply system provided in this embodiment of this application may further include a standby power supply circuit detection circuit.

The standby power supply circuit detection circuit is configured to: detect a standby circuit voltage of the standby power supply circuit, and send the detected standby circuit voltage to the controller. The controller is configured to: when determining, based on the standby circuit voltage, that overvoltage or undervoltage occurs in the standby power supply circuit, determine that the standby power supply circuit is abnormal, and control the control switch to turn on, and then switch to the standby power supply to supply power. The overvoltage means that a voltage is excessively high and exceeds a preset normal range. The undervoltage means that the voltage is extremely low and is lower than the preset normal range.

In some embodiments, when the power supply system is a three-phase alternating current power supply system and has no N wire, the standby power supply circuit detection circuit is further configured to: when determining, based on the standby circuit voltage, that a phase loss occurs in the standby power supply circuit, send phase loss information of the standby power supply circuit to the controller. The controller is further configured to: when determining, based on the phase loss information of the standby power supply circuit, that the standby power supply circuit is abnormal, control the control switch to turn on, and then switch to the main power supply circuit to supply power.

For a three-phase alternating current power supply system without an N wire, the phase loss is determined by the standby power supply circuit detection circuit. For a three-phase alternating current power supply system with an N wire, the phase loss needs to be determined by the controller. That is, when the power supply system is a three-phase alternating current power supply system and has the N wire, the standby power supply circuit detection circuit is further configured to detect a standby circuit voltage phase of the standby power supply circuit, and send the standby circuit voltage phase to the controller. The controller is further configured to determine, based on the standby circuit voltage and the standby circuit voltage phase, that the phase loss occurs in the standby power supply circuit, and control the control switch to turn on, and then switch to the main power supply circuit to supply power.

In some embodiments, if a frequency of the power supply system is excessive or is extremely low, power supply quality of the power supply is affected. In serious cases, a load may not work normally. Therefore, the standby power supply circuit detection circuit is further configured to obtain a standby circuit frequency based on the standby circuit voltage, and send the standby circuit frequency to the controller. The controller is configured to: when determining, based on the standby circuit frequency, that a frequency exception occurs on the standby power supply circuit, control the control switch to turn on, and then switch to the main power supply circuit to supply power.

In some embodiments, the standby power supply circuit detection circuit is further configured to obtain the standby circuit voltage phase, and send the standby circuit voltage phase to the controller. The controller is further configured to: when determining, based on the standby circuit voltage phase, that a phase reversal occurs in the standby power supply circuit, control the control switch to turn on.

In some embodiments, the power supply system further includes an auxiliary power supply circuit. The auxiliary power supply circuit is configured to: obtain electricity from a path obtained by combining the main power supply circuit and the standby power supply circuit, and convert a voltage of the obtained electricity to supply power to the controller.

In some embodiments, to facilitate maintenance and protect safety of maintenance personnel when a fault occurs, the power supply system may further include a main circuit protection switch and a standby protection switch. The main protection switch is connected in series to the active power contactor. When the main circuit protection switch is turned off, an entire path where the main power supply circuit is located is powered off. In some embodiments, the main circuit protection switch is connected in series to the main contact of the active power contactor. Similarly, the standby protection switch is connected in series to the standby power contactor, indicating that the standby protection switch is connected in series to the main contact of the standby power contactor. When the standby protection switch is turned off, a path where the standby power supply circuit is located is powered off.

In some embodiments, the power supply system further includes a backup capacitor. The backup capacitor is configured to provide a backup power supply for the controller.

A capacitor is used as a backup power supply. To be specific, the system provided in this embodiment of this application may further include the backup capacitor, configured to provide a backup power supply for the controller. When there is no power supply supplies power for the controller due to switching between the main power supply circuit and the standby power supply circuit, the backup capacitor supplies power to the controller for a short period of time. In a specific implementation, the backup capacitor may be configured on a single circuit board on which the controller is located. Therefore, in this embodiment of this application, it can be ensured that the controller is always powered by a reliable power supply, so that the controller can keep working normally.

Based on the power system provided in the foregoing embodiments, a control method of the power supply system is further provided in embodiments of this application. Advantages and effects of each solution of the foregoing power supply system are also applicable to the following control method. The power supply system includes an active power contactor, a standby power contactor, an auxiliary power contactor, a control switch, and a controller. The active power contactor is connected in series in a path of a main power supply circuit. The standby power contactor is connected in series in a path of a standby power supply circuit. The active power contactor and the standby power contactor are interlocked through the auxiliary power contactor. The auxiliary power contactor is connected in series to the control switch. The method includes:
  when the main power supply circuit is abnormal, controlling the control switch to change a status of the auxiliary power contactor, to switch to the standby power supply circuit; or when the standby power supply circuit is abnormal, controlling the control switch to change the status of the auxiliary power contactor, to switch to the main power supply circuit.

In some embodiments, the auxiliary power contactor includes a normally open contact and a normally closed contact. The normally open contact of the auxiliary power contactor and a normally closed contact of the standby power contactor are connected in series, and the normally open contact of the auxiliary power contactor and a coil of the active power contactor are connected in series. The normally closed contact of the auxiliary power contactor and a normally closed contact of the active power contactor are connected in series, and the normally closed contact of the auxiliary power contactor and a coil of the standby power contactor are connected in series. The coil of the auxiliary power contactor is connected in series to the control switch.

The controlling the control switch to change a status of the auxiliary power contactor, to switch to the standby power supply circuit In some embodiments includes:
  controlling the control switch to turn off, so that the coil of the auxiliary power contactor is powered off, and switching to the standby power supply circuit, where the control switch is a normally closed switch. The controlling the control switch to change a status of the auxiliary power contactor, to switch to the main power supply circuit In some embodiments includes: controlling the control switch to turn on, so that the coil of the auxiliary power contactor is powered on, and switching to the main power supply circuit.

In some embodiments, the method further includes: detecting a main circuit voltage of the main power supply circuit; and determining, based on the main circuit voltage, whether overvoltage, undervoltage, a phase loss, a phase reversal, or a frequency exception occurs in the main power supply circuit.

In some embodiments, the method further includes: detecting a standby circuit voltage of the standby power supply circuit; and determining, based on the standby circuit voltage, whether overvoltage, undervoltage, a phase loss, a phase reversal, or a frequency exception occurs in the standby power supply circuit.

According to the foregoing technical solutions, it can be learned that embodiments of this application have the following advantages.

The active power contactor of the power supply system is connected in series in the path of the main power supply circuit, and the standby power contactor is connected in series in the path of the standby power supply circuit. The active power contactor is configured to control connection and disconnection of the main power supply circuit, and the standby power contactor is configured to control connection and disconnection of the standby power supply circuit. The active power contactor and the standby power contactor are interlocked through the auxiliary power contactor. The auxiliary power contactor is connected in series to the control switch. When the main power supply circuit is abnormal, the controller changes the status of the auxiliary power contactor by controlling the control switch to switch to the standby power supply circuit. When the standby power supply circuit is abnormal, the control switch changes the status of the auxiliary power contactor to switch to the main power supply circuit.

According to the power supply system provided in this embodiment of this application, when the main power supply circuit or the standby power supply circuit is abnormal, the controller controls the control switch to change the status of the auxiliary power contactor that is connected in series to the main power supply circuit or the standby power supply circuit. Because the auxiliary power contactor implements interlocking between the main power supply circuit and the standby power supply circuit, changing the status of the auxiliary power contactor may switch a power supply path, so as to implement backup of dual power supply. The foregoing exception of power supply not only refers to a power failure in the main power supply circuit or the standby power supply circuit, but also includes an exception such as overvoltage, undervoltage, a phase loss, a phase reversal, an excessively high frequency, or an extremely low frequency that occurs on the power supply circuit. When at least one of the foregoing exceptions occurs in the power supply system, the power supply system may automatically switch to another normal power supply circuit to supply power, so as to ensure normal power supply to a load, so that the load works normally. In this way, a derivative hazard caused by that an abnormal power supply circuit still supplies power can be avoided, and a range of the exception will not be expanded.

DESCRIPTION OF EMBODIMENTS

To enable persons skilled in the art to better understand technical solutions provided in embodiments of this application, and to resolve a current problem that switching may be performed only when one of a main power supply circuit and a standby power supply circuit is powered down, the following describes, with reference to the accompanying drawings, an operating principle of switching to another power supply circuit only when one power supply circuit is powered down.

Figure 1:
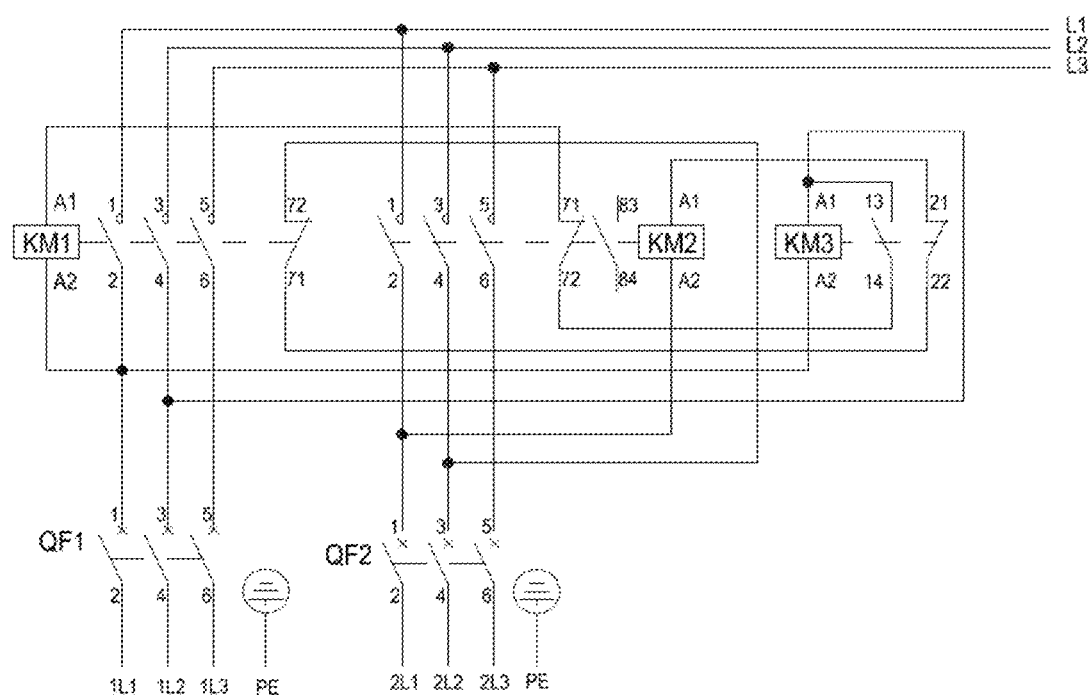
FIG. 1 is a schematic diagram of interlocking dual power supply.

FIG. 1 is a schematic diagram of interlocking dual power supply.

1L1 to 1L3 are three phases of a main power supply circuit, 2L1 to 2L3 are three phases of a standby power supply circuit, QF1 is a main circuit protection switch, and QF2 is a standby protection switch. KM1 is an active power contactor, KM2 is a standby power contactor, and KM3 is an auxiliary power contactor. In other words, KM3 is configured to select a main circuit for preferential power supply.

Auxiliary contacts 71 and 72 of the active power contactor KM1 and auxiliary contacts 71 and 72 of the standby power contactor KM2 are interlocked.

The following describes a principle of interlocking. When the active power contactor KM1 is powered on, three main contacts 1 to 6 of the active power contactor KM1 are turned on, and the auxiliary contacts 71 and 72 of the active power contactor KM1 are turned off. Because the auxiliary contacts 71 and 72 of the active power contactor KM1 are connected in series to a power supply path of the standby power contactor KM2, the standby power contactor KM2 is powered off, and the main contacts 1 to 6 of the standby power contactor KM2 keep being turned off and will not be turned on. In this way, the main power supply circuit supplies power, and the standby power supply circuit does not supply power. When the main power supply circuit is faulty and powered down, the active power contactor KM1 is powered off, and the standby power contactor KM2 is powered on, the main contacts 1 to 6 of the standby power contactor KM2 are turned on, and the auxiliary contacts 71 and 72 of the standby power contactor KM2 are turned off. Because the auxiliary contacts 71 and 72 of the standby power contactor KM2 are connected in series in a power supply path of the active power contactor KM1, the standby power supply circuit supplies power.

However, the power supply system shown in FIG. 1 may implement automatic switching to another power supply based on an interlocking mechanism only when one power supply is powered down, and may not implement switching to another power supply when another type of exception occurs. The another exception includes, for example, overvoltage, undervoltage, a phase loss, a phase reversal, an excessively high frequency, or an extremely low frequency.

According to the power supply system provided in embodiments of this application, when a main power supply circuit is abnormal, a control switch is controlled to act, to switch to a standby power supply circuit; or when the standby power supply circuit is abnormal, the control switch is controlled to act, to switch to the main circuit power supply circuit. The foregoing exception of power supply not only means a power failure in the main power supply circuit or the standby power supply circuit, but also includes an exception such as overvoltage, undervoltage, a phase loss, a phase reversal, an excessively high frequency, or an extremely low frequency. According to the technical solutions provided in embodiments of this application, when at least one of the foregoing exceptions occurs in the power supply system, the power supply system may automatically switch to another normal power supply circuit to supply power, so as to ensure normal power supply to a load, so that the load works normally. In this way, a derivative hazard caused by continuous power supply of an abnormal power supply circuit can be avoided, and a range of the exception will not be expanded.

The solutions provided in embodiments of this application are not only applicable to a three-phase power supply system, but also applicable to a single-phase power supply system. In other words, the solutions are applicable to a three-phase alternating current power supply system, and may also be applicable to a single-phase alternating current power supply system. This is not limited in embodiments of this application. The power supply system provided in embodiments of this application is applicable to any scenario of redundant dual power supply, for example, power supply to a communication device, power supply to artificial intelligence (AI), and power supply to a data center.

An example in which the power supply system provided in embodiments of this application is applicable to the three-phase power system is used below for description.

Figure 2:
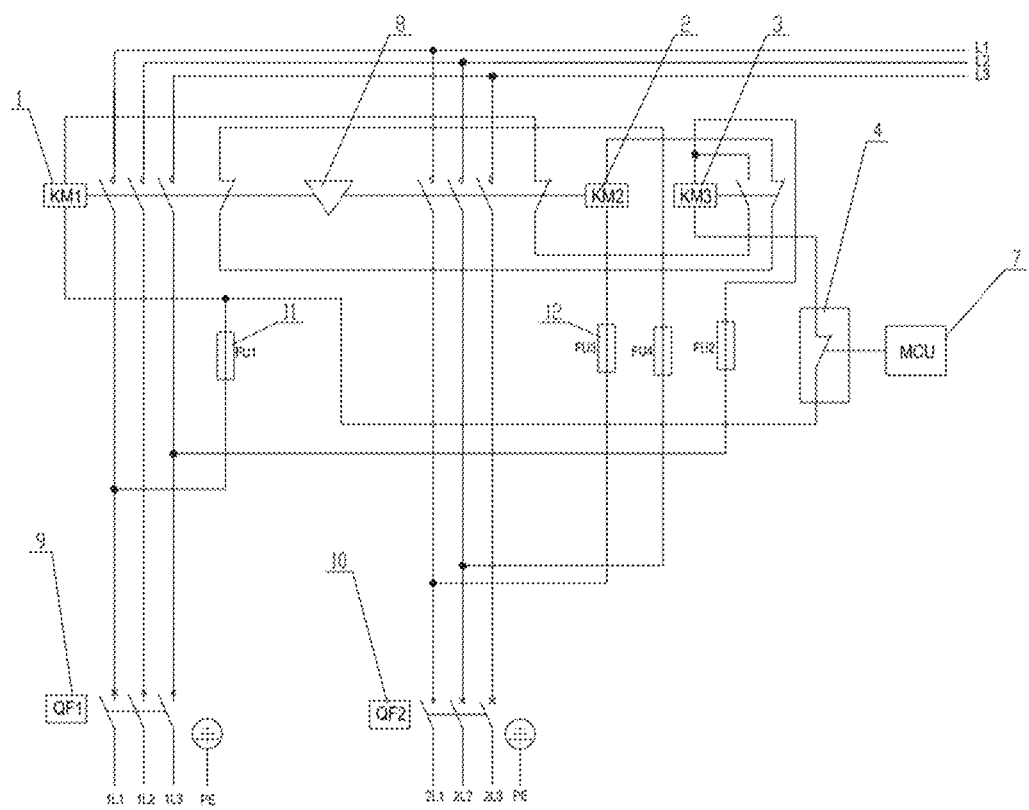
FIG. 2 is a schematic diagram of dual power supply according to an embodiment of this application.

FIG. 2 is a schematic diagram of a power supply system according to an embodiment of this application.

The power supply system provided in this embodiment of this application includes an active power contactor KM1, a standby power contactor KM2, an auxiliary power contactor KM3, a control switch 4, and a controller 7.

The active power contactor KM1 is configured to control connection and disconnection of the main power supply circuit, and the standby power contactor KM2 is configured to control connection and disconnection of the standby power supply circuit.

1L1 to 1L3 are three phases of the main power supply circuit, and 2L1 to 2L3 are three phases of the standby power supply circuit. KM1 is the active power contactor. KM2 is the standby power contactor. The auxiliary power contactor KM3 is configured as a selective contactor; that is, the auxiliary power contactor KM3 is configured to select the main power supply circuit for preferential power supply.

Both the active power contactor KM1 and the standby power contactor KM2 include corresponding coils and contacts. A position of the active power contactor KM1 in FIG. 2 indicates a coil of the active power contactor. It may be seen from FIG. 2 that KM1 corresponds to three main contacts and one auxiliary contact, and similarly, KM2 corresponds to three main contacts and one auxiliary contact. Three main contacts corresponding to KM1 are connected in series in a three-phase power supply of the main power supply circuit: 1L1, 1L2, and 1L3. Three main contacts corresponding to KM2 are connected in series in a three-phase power supply of the standby power supply circuit: 2L1, 2L2, and 2L3. The auxiliary contact corresponding to KM1 is connected in series to a normally open contact of the auxiliary power contactor, and the auxiliary contact corresponding to KM2 is connected in series to a normally closed contact of the auxiliary power contactor. When the coil of KM1 is powered on, the corresponding main contact is turned on, and the corresponding auxiliary contact is turned off. When the coil of KM1 is powered off, the corresponding main contact is turned off, and the corresponding auxiliary contact is turned on. Similarly, when the coil of KM2 is powered on, the corresponding main contact is turned on, and the corresponding auxiliary contact is turned off. When the coil of KM2 is powered off, the corresponding main contact is turned off, and the corresponding auxiliary contact is turned on. It should be understood that three main contacts of the active power contactor KM1 are normally open contacts, and the auxiliary contact is a normally closed contact. Three main contacts of the standby power contactor KM2 are normally open contacts, and the auxiliary contact is a normally closed contact.

In addition, to achieve a protection function, the power supply path is turned off when an exception occurs. The power supply system provided in this embodiment may further include a main circuit protection switch QF1.

The main circuit protection switch QF1 is connected in series to the active power contactor KM1. As shown in the figure, that the main circuit protection switch QF1 is connected in series to the active power contactor KM1 may be understood as that a contact of QF1 is connected in series to the contact of KM1. For a three-phase power supply system, the main circuit protection switch QF1 also includes three contacts, which respectively correspond to three phases.

Similarly, a standby protection switch QF2 is further included in a path of the standby power supply circuit.

The standby protection switch QF2 is connected in series to the standby power contactor KM2. As shown in the figure, that the standby protection switch QF2 is connected in series to the standby power contactor KM2 may be understood as that a contact of the standby protection switch QF2 is connected in series to the contact of the standby power contactor KM2. For the three-phase power supply system, the standby protection switch QF2 also includes three contacts, which respectively correspond to three phases.

The active power contactor KM1 is connected in series in the path of a main power supply circuit, and the standby power contactor KM2 is connected in series in the path of a standby power supply circuit.

As shown in FIG. 2, for the three-phase power supply system, when there is no N wire, the active power contactor KM1 includes three main contacts, which respectively correspond to three phases of a three-phase alternating current power supply system. Similarly, the standby power contactor KM2 also includes three main contacts, which respectively correspond to three phases of the three-phase alternating current power supply system. When the three-phase alternating current power supply system includes an N wire, the active power contactor KM1 includes four main contacts, which respectively correspond to three phases and the N wire. Similarly, the standby power contactor KM2 also includes four main contacts, which respectively correspond to three phases and the N wire. In embodiments of this application, an example in which the three-phase alternating current power supply system does not include the N wire is used for illustration. It may be understood that the technical solutions provided in embodiments of this application are also applicable to a scenario in which the three-phase alternating current power supply system includes the N wire.

Because the active power contactor KM1 is connected in series in the path of the main power supply circuit, the path of the main power supply circuit may be turned on only when the contact of the active power contactor KM1 is turned on. When the contact of the active power contactor KM1 is turned off, the main power supply circuit is turned off.

Similarly, because the standby power contactor KM2 is connected in series in the path of the standby power supply circuit, the path of the standby power supply circuit may be turned on only when the contact of the standby power contactor KM2 is turned on. When the contact of the standby power contactor KM2 is turned off, the standby power supply circuit is turned off.

The active power contactor KM1 and the standby power contactor KM2 are interlocked through the auxiliary power contactor KM3.

Because the active power contactor KM1 and the standby power contactor KM2 are interlocked through the auxiliary power contactor KM3, where interlocking means that only one power supply supplies power at a time, when the contact corresponding to the active power contactor KM1 is turned on, the contact corresponding to the standby power contactor KM2 is turned off. Similarly, when the contact corresponding to the active power contactor KM1 is turned off, the contact corresponding to the standby power contactor KM2 is turned on.

The auxiliary power contactor KM3 is connected in series to the control switch 4. For the three-phase power supply system, after being connected in series to the control switch 4, the auxiliary power contactor KM3 may be connected between any two phases of the main power supply circuit. That is, any two phases of the main power supply circuit supply power to the auxiliary power contactor KM. For a single-phase power supply system, the auxiliary power contactor KM3 and the control switch 4 may be connected in series and then connected between a live wire and a neutral wire.

The controller 7 is configured to: when the main power supply circuit is abnormal, control the control switch 4 to change a status of the auxiliary power contactor KM3, to switch to the standby power supply circuit to supply power; or when the standby power supply circuit is abnormal, control the control switch 4 to change the status of the auxiliary power contactor KM3, to switch to the main power supply circuit to supply power.

Both an exception of the main power supply circuit and an exception of the standby power supply circuit may include an exception such as a power failure, overvoltage, undervoltage, a phase loss, a phase reversal, an excessively high frequency, or an extremely low frequency.

It should be noted that the controller 7 may be implemented by using a microprocessor (MCU) or a single-chip microcomputer, or the controller 7 may be implemented by using a register. For example, the controller 7 controls the control switch to turn on or turn off by changing a value in the register. This is not specifically limited in this embodiment of this application. For ease of description, in figures in embodiments of this application, an example in which a controller is an MCU is used for description.

Because the auxiliary power contactor KM3 implements interlocking between the active power contactor KM1 and the standby power contactor KM2, and because the auxiliary power contactor KM3 is connected in series to the control switch 4, when the control switch 4 acts, a power supply path of the auxiliary power contactor KM3 is affected, and a status of the contact corresponding to the auxiliary power contactor is then affected. Because switching between the main power supply circuit and the standby power supply circuit is implemented by switching the auxiliary power contactor, and the main power supply circuit and the standby power supply circuit are interlocked through the auxiliary power contactor, the action of the control switch changes the status of the auxiliary power contactor, so that switching between the main power supply circuit and the standby power supply circuit can be implemented.

According to the power supply system provided in this embodiment of this application, the control switch and the controller are added to the power supply system. The control switch is connected in series to the auxiliary power contactor, and in some embodiments, the control switch is connected in series to the coil of the auxiliary power contactor. Consequently, the power supply path of the auxiliary power contactor is directly affected when the control switch acts. A specific state of the control switch directly affects the coil of the auxiliary power contactor to be powered on or powered off. For example, when the control switch is turned on, the coil of the auxiliary power contactor is powered on; or when the control switch is turned off, the coil of the auxiliary power contactor is powered off. For the three-phase power supply system, power supply to the coil of the auxiliary power contactor is provided by any two phases of the main power supply circuit, and when the status of the auxiliary power contactor changes, interlocking between the main power supply circuit and the standby power supply circuit may be implemented. Therefore, when the main power supply circuit is abnormal, the controller controls the control switch to change a status of the auxiliary power contactor, to switch to the standby power supply circuit to supply power; or when the standby power supply circuit is abnormal, the controller controls the control switch to change the status of the auxiliary power contactor, to switch to the main power supply circuit to supply power. According to the technical solutions provided in embodiments of this application, when at least one of the foregoing exceptions occurs in the power supply system, the power supply system may automatically switch to another normal power supply circuit to supply power, so as to ensure normal power supply to a load, so that the load works normally. In this way, a derivative hazard caused by that an abnormal power supply circuit still supplies power can be avoided, and a range of the exception will not be expanded.

Figure 3:
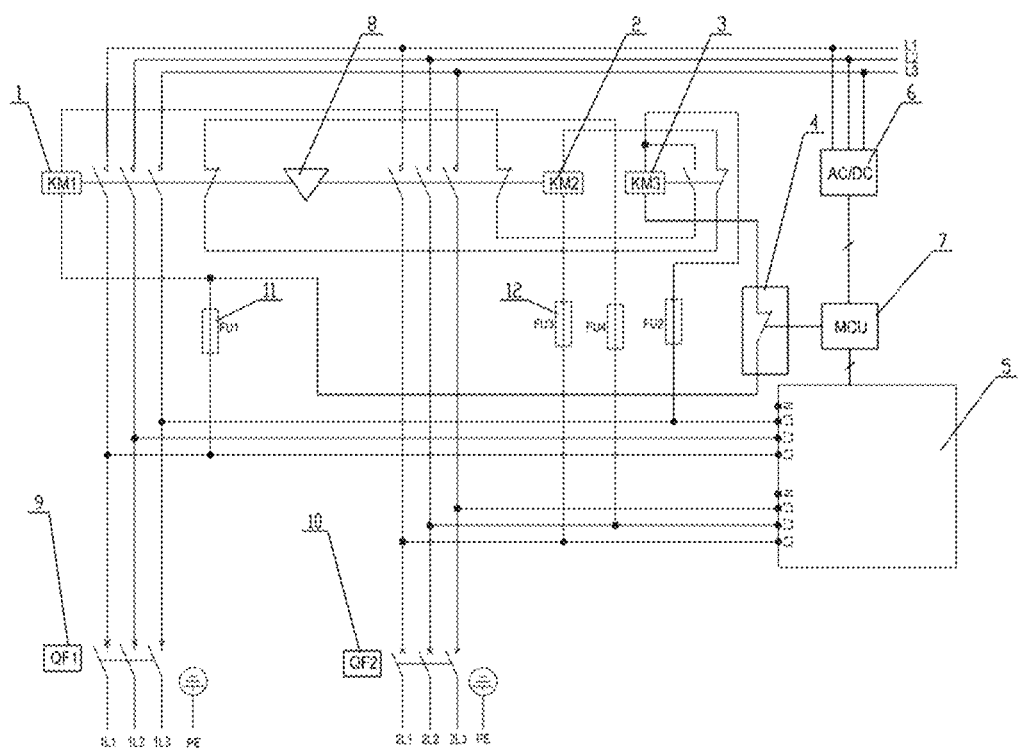
FIG. 3 is another schematic diagram of dual power supply according to an embodiment of this application.

FIG. 3 is a schematic diagram of another power supply system according to an embodiment of this application.

An auxiliary power supply circuit is added in FIG. 3 as compared with FIG. 2.

In FIG. 3, an example in which the auxiliary power supply circuit may at least include a rectifier circuit, namely, an AC/DC circuit 6, is used for description. Because power supply on the power supply line is an alternating current, and a controller 7 needs to be powered by a direct current, the AC/DC circuit 6 needs to rectify the alternating current to the direct current to supply power to the controller 7.

An auxiliary power contactor KM3 may implement interlocking between the active power contactor KM1 and the standby power contactor KM2. The auxiliary power contactor KM3 includes a normally open contact and a normally closed contact. As shown in FIG. 3, the normally open contact and the normally closed contact are sequentially included on the right side of a coil of the KM3. A coil of the auxiliary power contactor is located at KM3. That the coil is powered on or powered off affects actions of the normally open contact and the normally closed contact.

The normally open contact of the auxiliary power contactor KM3 is connected in series to a normally closed contact of a standby power contactor KM2, and the normally open contact of the auxiliary power contactor KM3 is connected in series to a coil of an active power contactor KM1. The normally closed contact of the auxiliary power contactor KM3 is connected in series to a normally closed contact of an active power contactor KM1, and the normally open contact of the auxiliary power contactor KM3 is connected in series to a coil of the standby power contactor KM2.

A control switch 4 is a normally closed switch.

The coil of the auxiliary power contactor KM3 is connected in series to the control switch 4.

The controller 7 is configured to: when a main power supply circuit is abnormal, control the control switch 4 to turn off, to switch to a standby power supply circuit to supply power; or when the standby power supply circuit is abnormal, control the control switch 4 to be normally closed, to switch to the main power supply circuit to supply power.

The following describes detection of exceptions on the main power supply circuit.

The power supply system provided in this embodiment further includes a main power supply circuit detection circuit 5.

The main power supply circuit detection circuit 5 is configured to: detect a main circuit voltage of the main power supply circuit, and send the detected main circuit voltage to the controller 7.

The controller 7 is configured to: when determining, based on a main circuit voltage, that overvoltage or undervoltage occurs in the main power supply circuit, determine that the main power supply circuit is abnormal, and control the control switch 4 to turn off. That is, when a voltage of the power supply system is abnormal, whether a voltage exception occurs may be determined by detecting a voltage signal.

When the control switch 4 is turned off, the coil of the auxiliary power contactor KM3 is powered off. Because the coil of the auxiliary power contactor KM3 is connected in series to the coil of the active power contactor KM1, when the coil of the auxiliary power contactor KM3 is powered off, the coil of the active power contactor KM1 is also powered off, main contacts of the active power contactor KM1 are all turned off in three phases, and power supply is stopped. Because the coil of the auxiliary power contactor KM3 is powered off, the corresponding normally open contact is turned off, and the corresponding normally closed contact is turned on. Because the coil of the standby power contactor KM2 is connected in series to the normally closed contact of the auxiliary power contactor KM3, when the normally closed contact of the auxiliary power contactor KM3 is turned on, the coil of the standby power contactor KM2 is powered on. In this case, main contacts of the standby power contactor KM2 are turned on in three phases, to start using the standby power supply circuit, and switching from the main power supply circuit to the standby power supply circuit is implemented.

The following describes phase loss detection on the main power supply circuit.

Determining a phase loss when the power supply system is a three-phase alternating current power supply system and there is no N wire is first described. The main power supply circuit detection circuit 5 is further configured to: when determining, based on the main circuit voltage, that a phase loss occurs in the main power supply circuit, send phase loss information of the main power supply circuit to the controller 7.

The controller 7 is further configured to control the control switch 4 to turn off in response to the phase loss information of the main power supply circuit. That is, the controller 7 controls the control switch 4 to turn off after receiving the phase loss information of the main power supply circuit sent by the main power supply circuit detection circuit 5.

For example, the main power supply circuit detection circuit 5 may send the phase loss information of the main power supply circuit to the controller 7 as a signal, for example, a high level, indicating that the phase loss occurs on the main power supply circuit.

That is, for the three-phase alternating current power supply system without the N wire, whether the phase loss occurs in the main power supply circuit may be determined by the main power supply circuit detection circuit 5 based on the main circuit voltage. The main power supply circuit detection circuit 5 only needs to notify the controller 7 of a phase loss determining result, and then the controller 7 determines, based on the phase loss determining result, whether to control the control switch 4 to act.

The following describes determining a phase loss when the power supply system is a three-phase alternating current power supply system and there is an N wire. The main power supply circuit detection circuit 5 is further configured to: detect a main circuit voltage phase of the main power supply circuit, and send the main circuit voltage phase to the controller 7.

The controller 7 is further configured to determine, based on the main circuit voltage and the main circuit voltage phase, that a phase loss occurs in the main power supply circuit, and control the control switch 4 to turn off.

When the N wire exists, the phase loss may be determined based on a voltage phase. In some embodiments, a specific phase loss situation in L1, L2, and L3 may be located. For example, a phase loss occurs in L1, or a phase loss occurs in L2.

That is, for the three-phase alternating current power supply system with the N wire, determining whether the phase loss occurs in the main power supply circuit is implemented by the controller 7. In some embodiments, the controller 7 determines whether the phase loss occurs in the main power supply circuit with reference to the main circuit voltage and the main circuit voltage phase.

The following describes determining a frequency of the main power supply circuit.

The main power supply circuit detection circuit 5 is further configured to obtain a main circuit frequency based on the main circuit voltage, and send the main circuit frequency to the controller 7.

The controller 7 is configured to: when determining, based on the main circuit frequency, that a frequency exception occurs in the main power supply circuit, control the control switch 4 to turn off.

That is, whether the frequency exception occurs in the main power supply circuit may be obtained based on the main circuit voltage. The frequency exception herein includes an excessively high frequency or an extremely low frequency. That is, that a frequency exceeds a normal frequency range is considered as the frequency exception. For example, for a power grid frequency of 50 Hz, when the power supply frequency is lower than 45 Hz or higher than 55 Hz, the frequency is considered to be abnormal. The frequency exception may cause harm to a power supply device and an electrical device. Consequently, when the frequency is abnormal, the power supply needs to be switched, in other words, a power supply path is switched to supply power.

The following describes determining a main power supply circuit phase.

The main power supply circuit detection circuit 5 is further configured to obtain the main circuit voltage phase, and send the main circuit voltage phase to the controller 7.

The controller 7 is further configured to: when determining, based on the main circuit voltage phase, that a phase reversal occurs in the main power supply circuit, control the control switch 4 to turn off.

The phase reversal indicates that a phase sequence is incorrect, that is, a positive phase and a negative phase are incorrect.

The foregoing has described determining manners when various exceptions occur on the main power supply circuit. In conclusion, when the exception occurs on the main power supply circuit, the controller 7 controls the control switch 4 to turn off, to turn off the path of the main power supply circuit, and switches to the standby power supply circuit at the same time, so as to implement switching from the main power supply circuit to the standby power supply circuit.

Still with reference to FIG. 3, the following describes manners of determining various exceptions of the standby power supply circuit.

It should be noted that the main power supply circuit detection circuit and the standby power supply circuit detection circuit may be integrated on one circuit board or chip, namely, 5 in FIG. 3. Therefore, in this embodiment of this application, both the main power supply circuit detection circuit and the standby power supply circuit detection circuit correspond to the number 5.

Determining overvoltage or undervoltage on the standby power supply circuit is first described.

The power supply system provided in this embodiment of this application further includes a standby power supply circuit detection circuit 5.

The standby power supply circuit detection circuit 5 is configured to: detect a standby circuit voltage of the standby power supply circuit, and send the detected standby circuit voltage to the controller 7.

The controller 7 is configured to: when determining, based on the standby circuit voltage, that overvoltage or undervoltage occurs in the standby power supply circuit, determine that the standby power supply circuit is abnormal, and control the control switch 4 to turn on.

When the control switch 4 is turned on, the coil of the auxiliary power contactor KM3 is powered on, the normally closed contact corresponding to the auxiliary power contactor KM3 is turned off, and the normally open contact is turned on. Because the normally closed contact of the auxiliary power contactor KM3 is connected in series to the coil of the standby power contactor KM2, when the normally closed contact of the KM3 is turned off, the coil of the standby power contactor KM2 is powered off, so that main contacts of the standby power contactor KM2 are all turned off in three phases, and the standby power supply circuit is turned off. Because the normally open contact of the auxiliary power contactor KM3 is turned on, and the normally open contact of the auxiliary power contactor KM3 is connected in series to the coil of the active power contactor KM1, when the normally open contact of the auxiliary power contactor KM3 is turned on, the coil of the active power contactor KM1 is powered on, main contacts of the active power contactor KM1 are then turned on in three phases, and the main power supply circuit starts to supply power, so that switching from the standby power supply circuit to the main power supply circuit is implemented.

Similar to main power supply circuit detection, the following describes determining a phase loss in the standby power supply circuit. When the power supply system is a three-phase alternating current power supply system and has no N wire, the standby power supply circuit detection circuit 5 is further configured to: when determining, based on the standby circuit voltage, that the phase loss occurs in the standby power supply circuit, send phase loss information of the standby power supply circuit to the controller 7.

The controller 7 is configured to: determine, based on the phase loss information of the standby power supply circuit, that the standby power supply circuit is abnormal, and control the control switch 4 to turn on.

That is, for the three-phase alternating current power supply system without the N wire, whether the phase loss occurs in the standby power supply circuit may be determined by the standby power supply circuit detection circuit 5 based on the standby circuit voltage. The standby power supply circuit detection circuit 5 only needs to notify the controller 7 of a phase loss determining result, and then the controller 7 determines, based on the phase loss determining result, whether to control the control switch 4 to act.

The following describes determining a phase loss when the power supply system is a three-phase alternating current power supply system and there is an N wire. The standby power supply circuit detection circuit 5 is further configured to: detect a standby circuit voltage phase of the standby power supply circuit, and send the standby circuit voltage phase to the controller 7.

The controller 7 is further configured to determine, based on the standby circuit voltage and the standby circuit voltage phase, that the phase loss occurs in the standby power supply circuit, and control the control switch 4 to turn on.

That is, for the three-phase alternating current power supply system with the N wire, whether the phase loss occurs in the standby power supply circuit may not be determined by the standby power supply circuit detection circuit 5 based on the standby circuit voltage independently. Instead, the controller 7 determines, with reference to the standby circuit voltage and the standby circuit voltage phase, whether the phase loss occurs in the standby power supply circuit.

The following describes determining a frequency of the standby power supply circuit.

The standby power supply circuit detection circuit 5 is further configured to obtain a standby circuit frequency based on the standby circuit voltage, and send the standby circuit frequency to the controller 7.

The controller 7 is configured to: when determining, based on the standby circuit frequency, that a frequency exception occurs in the standby power supply circuit, control the control switch 4 to turn on.

That is, whether the frequency exception occurs in the standby power supply circuit may be obtained based on the standby circuit voltage. The frequency exception herein includes an excessively high frequency or an extremely low frequency. That is, that a frequency exceeds a normal frequency range is considered as the frequency exception. For example, for a power grid frequency of 50 Hz, a normal frequency range may be 50 Hz to 55 Hz, and 45 Hz to 50 Hz. That is, when the power supply frequency is lower than 45 Hz or higher than 55 Hz, the frequency is considered as abnormal. The frequency exception may cause harm to a power supply device and an electrical device. Consequently, when the frequency is abnormal, the power supply needs to be switched, in other words, a power supply path is switched.

The following describes determining a phase of the standby power supply circuit.

The standby power supply circuit detection circuit 5 is further configured to obtain the standby circuit voltage phase, and send the standby circuit voltage phase to the controller 7.

The controller 7 is further configured to: when determining, based on the standby circuit voltage phase, that a phase reversal occurs in the standby power supply circuit, control the control switch 4 to turn on.

The phase reversal indicates that a phase sequence is incorrect, that is, a positive phase and a negative phase are incorrect.

The foregoing has described determining manners when various exceptions occur on the standby power supply circuit. In conclusion, when the exception occurs on the standby power supply circuit, the controller 7 controls the control switch 4 to turn on, to turn off the path of the standby power supply circuit, and switches to the main power supply circuit at the same time, so as to implement switching from the standby power supply circuit to the main power supply circuit.

In addition, to improve an integration level of the power supply system, the power supply system provided in this embodiment of this application obtains power from a combination of the main power supply circuit and the standby power supply circuit to supply power to the controller 7. The following provides detailed description still with reference to FIG. 3.

The power supply system provided in this embodiment of this application further includes an auxiliary power supply circuit 6.

The auxiliary power supply circuit 6 is configured to obtain electricity from a path obtained by combining the main power supply circuit and the standby power supply circuit, and convert a voltage of the obtained electricity to supply power to the controller 7.

The auxiliary power supply circuit 6 provided in this embodiment of this application is disposed after the main power supply circuit and the standby power supply circuit are combined, so that regardless that the main power supply circuit or the standby power supply circuit supplies power, it can be ensured that the controller 7 can always be powered by a power supply. In this way, when the power supply system is abnormal, the controller 7 can control the control switch 4 to act in a timely manner, to implement switching of the power supply path, without a power supply interruption or a power supply interval. The auxiliary power supply circuit provided in this embodiment of this application includes only one path, that is, power is obtained after the main power supply circuit and the standby power supply circuit are combined. In this way, an apparatus for obtaining electricity in one path can be saved, and a hardware structure for supplying power to the auxiliary power supply is further simplified.

In addition, an MCU is used as an example of the controller provided in this embodiment of this application. Because the MCU needs a power supply to supply power to the MCU to control another component, the MCU is generally located on a single circuit board. However, in a process of switching between the main power supply circuit and the standby power supply circuit, a transient power failure may occur. That is, the MCU has no power supply, and the auxiliary power supply circuit 6 does not supply power to the MCU in a timely manner. In this embodiment of this application, to resolve a power failure interval in the foregoing scenario, ensure that the MCU is always powered on, so as to control the control switch 4 to act, a backup power supply is provided for the MCU.

For example, in a possible implementation, a capacitor is used as the backup power supply. To be specific, the system provided in this embodiment of this application may further include a backup capacitor. The backup capacitor (not shown in the figure) is configured to provide the backup power supply for the controller. When there is no power supply supplies power for the MCU due to switching between the main power supply circuit and the standby power supply circuit, the backup capacitor supplies power to the MCU for a short period of time. A capacitance value of the backup capacitor is not In some embodiments limited in this embodiment of this application. A parameter of the backup capacitor may be selected based on a specific application scenario. For example, the parameter of the backup capacitor may be selected based on a time length in which the backup supply circuit supplies power. In specific implementation, the backup capacitor may be disposed on a single circuit board on which the MCU is located. Therefore, in this embodiment of this application, it can be ensured that the MCU is always powered by a reliable power supply, so that the MCU can keep working normally.

An application scenario of the power supply system provided in the foregoing embodiment is not limited in this embodiment of this application. A successive load or an electric device may supply power to, for example, an air conditioner, or a transformer.

It may be understood that, in addition to the foregoing power supply manner, another power supply manner may also be used for the controller 7. This is not In some embodiments limited in this embodiment of this application. The foregoing is merely an example of the auxiliary power supply circuit 6 that includes the AC/DC circuit. The auxiliary power supply circuit 6 may further include a direct current/direct current circuit, namely, a DC/DC circuit, where the DC/DC circuit may be used as a voltage step-down circuit to provide a required voltage level for the MCU. The DC/DC circuit may include one stage, or may include two stages. For example, when the DC/DC circuit includes two stages, the first stage is used as a voltage step-down circuit, and the second stage is used as a voltage regulator circuit. This is not In some embodiments limited in this embodiment of this application.

Figure 4:
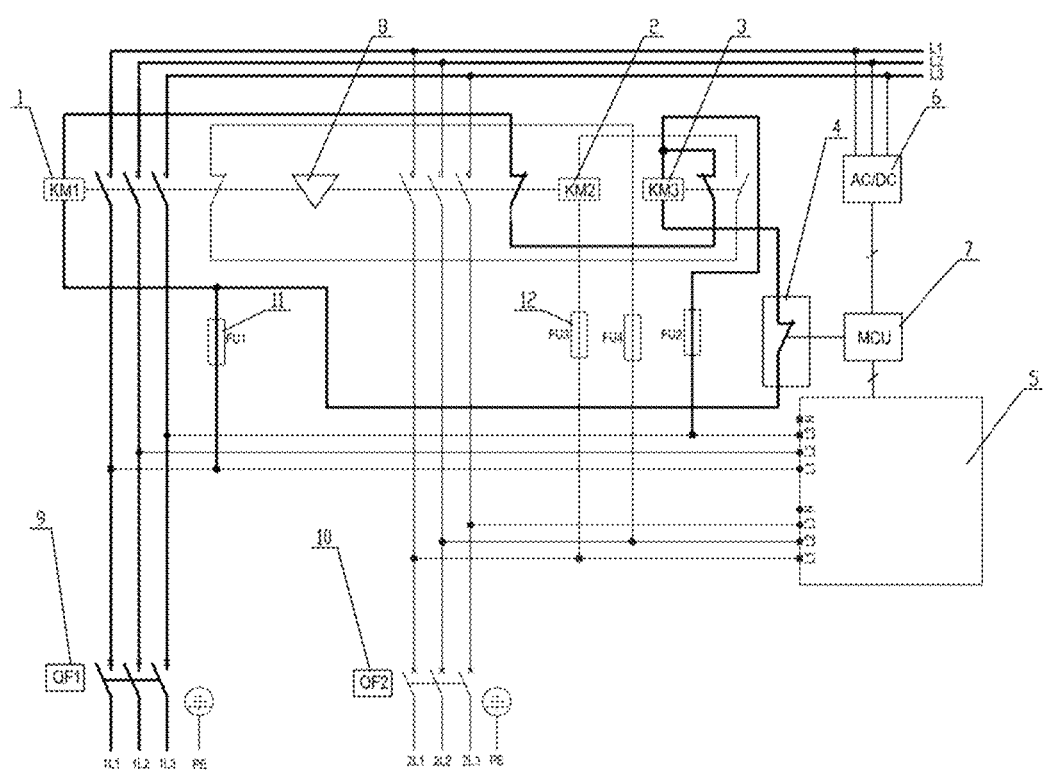
FIG. 4 is a schematic diagram of a main power supply circuit according to an embodiment of this application.
Figure 5:
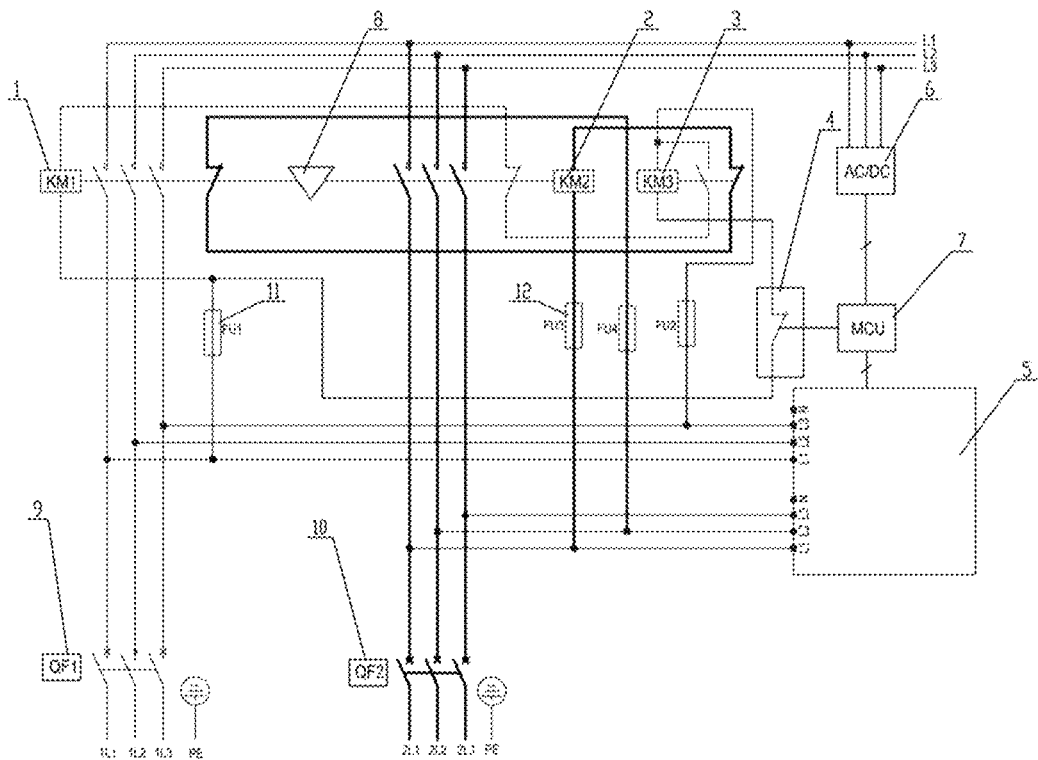
FIG. 5 is a schematic diagram of a standby power supply circuit according to an embodiment of this application.

To enable persons skilled in the art to more intuitively understand the technical solutions provided in embodiments of this application, the following separately describes, with reference to FIG. 4 and FIG. 5, states of supplying power by a main power supply circuit and a standby power supply circuit. Connection relationships corresponding to FIG. 4 and FIG. 5 are the same as that in FIG. 3. A path in bold in FIG. 4 is a path of the main power supply circuit. The path in bold in FIG. 5 is a path of the standby power supply circuit.

FIG. 4 is a schematic diagram of still another power supply system according to an embodiment of this application.

In this case, a main circuit protection switch QF1 is turned on, and a main contact of the active power contactor KM1 is turned on. That is, 1L1 is connected to L1, 1L2 is connected to L2, and 1L3 is connected to L3. In this case, all standby contacts of the standby power contactor KM2 are turned off, that is, 2L1 is disconnected from L1, 2L2 is disconnected from L2, and 2L3 is disconnected from L3.

FIG. 5 is a schematic diagram of yet another power supply system according to an embodiment of this application.

In this case, a standby protection switch QF2 is turned on, and the main contacts of the standby power contactor KM2 are turned on. That is, 2L1 is connected to L1, 2L2 is connected to L2, and 2L3 is connected to L3. In this case, all main contacts of the main power contactor KM1 are turned off, that is, 1L1 is disconnected from L1, 1L2 is disconnected from L2, and 1L3 is disconnected from L3.

It should be noted that the voltage mentioned in the foregoing embodiments of this application may be an amplitude of the voltage, or may be a valid value of the voltage.

The frequency may be obtained based on a signal of the voltage.

A specific implementation of each switch is not limited in the foregoing embodiments, and may be, for example, a relay, a circuit breaker, a contactor, or a thyristor.

Method Embodiment

Based on the power supply system provided in the foregoing embodiments, an embodiment of this application further provides a control method of the power supply system. The following gives a detailed description with reference to the accompanying drawings.

Figure 6:
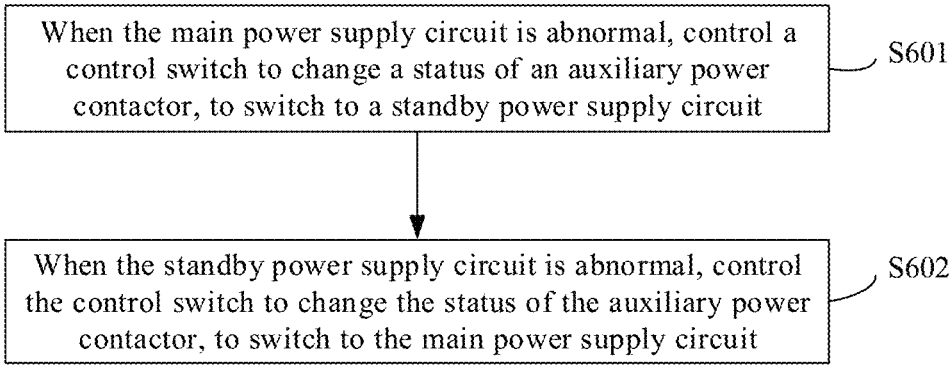
FIG. 6 is a flowchart of a control method according to an embodiment of this application.

FIG. 6 is a flowchart of a control method according to this embodiment of this application.

According to the control method of the power supply system provided in this embodiment of this application, switching control of a dual power supply system is implemented. The power supply system includes an active power contactor, a standby power contactor, an auxiliary power contactor, a control switch, and a controller. The active power contactor is connected in series in a path of a main power supply circuit, and the standby power contactor is connected in series in a path of a standby power supply circuit. The active power contactor and the standby power contactor are interlocked through the auxiliary power contactor. The auxiliary power contactor is connected in series to the control switch. For example, for a three-phase power supply system, the auxiliary power contactor and the control switch are connected in series and then connected between any two phases of the main power supply circuit. For a single-phase power supply system, the auxiliary power contactor and the control switch may be connected in series and then connected between a live wire and a neutral wire. For a specific structure of the power supply system, refer to the architectures and connection relationships shown in any one of FIG. 2 to FIG. 5 corresponding to the foregoing power supply system embodiments. The power supply system is generally an alternating current power supply system, and may be a three-phase power supply system or a single-phase power supply system. When the power supply system is a three-phase power supply system, an N wire may be included or may not be included.

The method includes the following operations.

S601: When the main power supply circuit is abnormal, control the control switch to change a status of the auxiliary power contactor, to switch to the standby power supply circuit, that is, switch to the standby power supply circuit to supply power.

S602: When the standby power supply circuit is abnormal, control the control switch to change the status of the auxiliary power contactor, to switch to the main power supply circuit, that is, switch to the main power supply circuit to supply power.

For details, still refer to the power supply system shown in FIG. 2. Because the active power contactor KM1 is connected in series in a path of the main power supply circuit, the path of the main power supply circuit may be turned on only when the contact of the active power contactor KM1 is turned on. When the contact of the active power contactor KM1 is turned off, the main power supply circuit is turned off.

Similarly, because the standby power contactor KM2 is connected in series in the path of the standby power supply circuit, the path of the standby power supply circuit may be turned on only when the contact of the standby power contactor KM2 is turned on. When the contact of the standby power contactor KM2 is turned off, the standby power supply circuit is turned off.

The active power contactor KM1 and the standby power contactor KM2 are interlocked through the auxiliary power contactor KM3.

Because the active power contactor KM1 and the standby power contactor KM2 are interlocked through the auxiliary power contactor KM3, where interlocking means that only one power supply supplies power at a time, when the contact corresponding to the active power contactor KM1 is turned on, the contact corresponding to the standby power contactor KM2 is turned off. Similarly, when the contact corresponding to the active power contactor KM1 is turned off, the contact corresponding to the standby power contactor KM2 is turned off.

Because the auxiliary power contactor KM3 implements interlocking between the active power contactor KM1 and the standby power contactor KM2, and because the auxiliary power contactor KM3 is connected in series to the control switch 4, when the control switch 4 acts, a path of the auxiliary power contactor KM3 is affected, so that switching between the main power supply circuit and the standby power supply circuit can be implemented.

According to the control method provided in this embodiment of this application, the control switch is connected in series to the auxiliary power contactor, and In some embodiments, the control switch is connected in series to the coil of the auxiliary power contactor. Consequently, the power supply path of the auxiliary power contactor is directly affected when the control switch acts. A specific state of the control switch directly affects the coil of the auxiliary power contactor to be powered on or powered off. For example, when the control switch is turned on, the coil of the auxiliary power contactor is powered on, or when the control switch is turned off, the coil of the auxiliary power contactor is powered off. For the three-phase power supply system, power supply to the coil of the auxiliary power contactor is provided by any two phases of the main power supply circuit, and when the status of the auxiliary power contactor changes, interlocking between the main power supply circuit and the standby power supply circuit may be implemented. Therefore, when the main power supply circuit is abnormal, the controller controls the control switch to change a status of the auxiliary power contactor, to switch to the standby power supply circuit to supply power; or when the standby power supply circuit is abnormal, the controller controls the control switch to change the status of the auxiliary power contactor, to switch to the main power supply circuit to supply power. According to the technical solutions provided in embodiments of this application, when at least one of the foregoing exceptions occurs in the power supply system, the power supply system may automatically switch to another normal power supply circuit to supply power, so as to ensure normal power supply to a load, so that the load works normally. In this way, a derivative hazard caused by that an abnormal power supply circuit still supplies power can be avoided, and a range of the exception will not be expanded.

The auxiliary power contactor includes a normally open contact and a normally closed contact. The normally open contact of the auxiliary power contactor and a normally closed contact of the standby power contactor are connected in series, and the normally open contact of the auxiliary power contactor and a coil of the active power contactor are connected in series. The normally closed contact of the auxiliary power contactor and a normally closed contact of the active power contactor are connected in series, and the normally closed contact of the auxiliary power contactor and a coil of the standby power contactor are connected in series. The coil of the auxiliary power contactor is connected in series to the control switch.

Controlling the control switch to change a status of the auxiliary power contactor, to switch to the standby power supply circuit In some embodiments includes:
controlling the control switch to turn off, so that the coil of the auxiliary power contactor is powered off, and switching to the standby power supply circuit, where the control switch is a normally closed switch.

Controlling the control switch to change a status of the auxiliary power contactor, to switch to the main power supply circuit In some embodiments includes:

controlling the control switch to turn on, so that the coil of the auxiliary power contactor is powered on, and switching to the main power supply circuit.

For actions of the foregoing switches and contactors, refer to the description of the power supply system embodiment. Details are not described herein again.

The following describes manners of determining various specific exceptions.

The method further includes: detecting a main circuit voltage of the main power supply circuit; and determining, based on the main circuit voltage, whether overvoltage, undervoltage, a phase loss, a phase reversal, or a frequency exception occurs in the main power supply circuit.

The method further includes: detecting a standby circuit voltage of the standby power supply circuit; and determining, based on the standby circuit voltage, whether overvoltage, undervoltage, a phase loss, a phase reversal, or a frequency exception occurs in the standby power supply circuit.

The following describes phase loss detection on the main power supply circuit.

Determining a phase loss when the power supply system is a three-phase alternating current power supply system and there is no N wire is first described. The main power supply circuit detection circuit 5 is further configured to: when determining, based on the main circuit voltage, that a phase loss occurs in the main power supply circuit, send phase loss information of the main power supply circuit to the controller 7.

The controller 7 is further configured to control the control switch 4 to turn off in response to the phase loss information of the main power supply circuit. That is, the controller 7 controls the control switch 4 to turn off after receiving the phase loss information of the main power supply circuit sent by the main power supply circuit detection circuit 5.

For example, the main power supply circuit detection circuit 5 may send the phase loss information of the main power supply circuit to the controller 7 as a signal, for example, a high level, indicating that the phase loss occurs on the main power supply circuit.

That is, for the three-phase alternating current power supply system without the N wire, whether the phase loss occurs in the main power supply circuit may be determined by the main power supply circuit detection circuit 5 based on the main circuit voltage. The main power supply circuit detection circuit 5 only needs to notify the controller 7 of a phase loss determining result, and then the controller 7 determines, based on the phase loss determining result, whether to control the control switch 4 to act.

The following describes determining a phase loss when the power supply system is a three-phase alternating current power supply system and there is an N wire. The main power supply circuit detection circuit 5 is further configured to: detect a main circuit voltage phase of the main power supply circuit, and send the main circuit voltage phase to the controller 7.

The controller 7 is further configured to determine, based on the main circuit voltage and the main circuit voltage phase, that a phase loss occurs in the main power supply circuit, and control the control switch 4 to turn off.

When the N wire exists, the phase loss may be determined based on a voltage phase. In some embodiments, a specific phase loss situation in L1, L2, and L3 may be located. For example, a phase loss occurs in L1, or a phase loss occurs in L2.

That is, for the three-phase alternating current power supply system with the N wire, whether the phase loss occurs in the main power supply circuit is implemented by the controller 7. In some embodiments, the controller 7 determines whether the phase loss occurs in the main power supply circuit with reference to the main circuit voltage and the main circuit voltage phase.

The following describes determining a frequency of the main power supply circuit.

The main power supply circuit detection circuit 5 is further configured to obtain a main circuit frequency based on the main circuit voltage, and send the main circuit frequency to the controller 7.

The controller 7 is configured to: when determining, based on the main circuit frequency, that a frequency exception occurs in the main power supply circuit, control the control switch 4 to turn off.

That is, whether the frequency exception occurs in the main power supply circuit may be obtained based on the main circuit voltage. The frequency exception herein includes an excessively high frequency or an extremely low frequency. That is, that a frequency exceeds a normal frequency range is considered as the frequency exception. For example, for a power grid frequency of 50 Hz, when the power supply frequency is lower than 45 Hz or higher than 55 Hz, the frequency is considered to be abnormal. The frequency exception may cause harm to a power supply device and an electrical device. Consequently, when the frequency is abnormal, the power supply needs to be switched, in other words, a power supply path is switched.

The following describes determining a phase of the main power supply circuit.

The main power supply circuit detection circuit 5 is further configured to obtain the main circuit voltage phase, and send the main circuit voltage phase to the controller 7.

The controller 7 is further configured to: when determining, based on the main circuit voltage phase, that a phase reversal occurs in the main power supply circuit, control the control switch 4 to turn off.

The phase reversal indicates that a phase sequence is incorrect, that is, a positive phase and a negative phase are incorrect.

The foregoing describes determining manners when various exceptions occur on the main power supply circuit. In conclusion, when the exception occurs on the main power supply circuit, the controller 7 controls the control switch 4 to turn off, to turn off the path of the main power supply circuit, and switches to the standby power supply circuit at the same time, so as to implement switching from the main power supply circuit to the standby power supply circuit.

Still with reference to FIG. 3, the following describes manners of determining various exceptions of the standby power supply circuit.

It should be noted that the main power supply circuit detection circuit and the standby power supply circuit detection circuit may be integrated on one circuit board or chip, namely, 5 in FIG. 3. Therefore, in this embodiment of this application, both the main power supply circuit detection circuit and the standby power supply circuit detection circuit correspond to the number 5.

Determining overvoltage or undervoltage on the standby power supply circuit is first described.

The power supply system provided in this embodiment of this application further includes a standby power supply circuit detection circuit 5.

The standby power supply circuit detection circuit 5 is configured to: detect a standby circuit voltage of the standby power supply circuit, and send the detected standby circuit voltage to the controller 7.

The controller 7 is configured to: when determining, based on the standby circuit voltage, that overvoltage or undervoltage occurs in the standby power supply circuit, determine that the standby power supply circuit is abnormal, and control the control switch 4 to turn on.

For specific implementations of determining various exceptions, refer to the foregoing description of the power supply system embodiment. Details are not described herein again.

The method provided in embodiments of this application is not only applicable to a three-phase power supply system, but also applicable to a single-phase power supply system, that is, is applicable to a three-phase alternating current power supply system, or is applicable to a single-phase alternating current power supply system. This is not limited in embodiments of this application. The method provided in embodiments of this application is applicable to any scenario of redundant dual power supply, for example, power supply to a communication device, power supply to AI, and power supply to a data center. It should be noted that advantages and effects of embodiments of the power supply system provided in the foregoing embodiments are generally applicable to embodiments of the control method. For brevity, details are not described herein again.

It should be understood that in this application, "at least one (item)" refers to one or more and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A power supply system, comprising:
   an active power contactor connected in series in a path of a main power supply circuit;
   a standby power contactor connected in series in a path of a standby power supply circuit, wherein the active power contactor and the standby power contactor are interlocked through an auxiliary power contactor, and the auxiliary power contactor is connected in series to a control switch; and
   a controller configured to: when the main power supply circuit is abnormal, control the control switch to change a status of the auxiliary power contactor, to switch to the standby power supply circuit; and when the standby power supply circuit is abnormal, control the control switch to change the status of the auxiliary power contactor, to switch to the main power supply circuit;
   wherein the auxiliary power contactor comprises a normally open contact and a normally closed contact;
   the normally open contact of the auxiliary power contactor and a normally closed contact of the standby power contactor are connected in series, and the normally open contact of the auxiliary power contactor and a coil of the active power contactor are connected in series; and the normally closed contact of the auxiliary power contactor and a normally closed contact of the active power contactor are connected in series, and the normally closed contact of the auxiliary power contactor and a coil of the standby power contactor are connected in series;
   the control switch is a normally closed switch;
   a coil of the auxiliary power contactor is connected in series to the control switch; and
   the controller is further configured to: when the main power supply circuit is abnormal, control the control switch to be turned off, so that the coil of the auxiliary power contactor is powered off, and switch to the standby power supply circuit; or when the standby power supply circuit is abnormal, control the control switch to be turned on, so that the coil of the auxiliary power contactor is powered on, and switch to the main power supply circuit.

2. The system according to claim 1, further comprising:
   a main power supply circuit detection circuit configured to: detect a main circuit voltage of the main power supply circuit, and send the detected main circuit voltage to the controller; and
   wherein the controller is configured to: when determining, based on the main circuit voltage, that overvoltage or undervoltage occurs in the main power supply circuit, determine that the main power supply circuit is abnormal, and control the control switch to turn off.

3. The system according to claim 2, wherein the power supply system is a three-phase alternating current power supply system and has no N wire, and the main power supply circuit detection circuit is further configured to: when determining, based on the main circuit voltage, that a phase loss occurs in the main power supply circuit, send phase loss information of the main power supply circuit to the controller; and
   the controller is further configured to control the control switch to turn off in response to the phase loss information of the main power supply circuit.

4. The system according to claim 2, wherein the power supply system is a three-phase alternating current power supply system and has an N wire, and the main power supply circuit detection circuit is further configured to: detect a main circuit voltage phase of the main power supply circuit, and send the main circuit voltage phase to the controller; and
   the controller is further configured to determine, based on the main circuit voltage and the main circuit voltage phase, that a phase loss occurs in the main power supply circuit, and control the control switch to turn off.

5. The system according to claim 2, wherein the main power supply circuit detection circuit is further configured to: obtain a main circuit frequency based on the main circuit voltage, and send the main circuit frequency to the controller; and the controller is configured to: when determining, based on the main circuit frequency, that a frequency exception occurs in the main power supply circuit, control the control switch to turn off.

6. The system according to claim 2, wherein the main power supply circuit detection circuit is further configured to: obtain a main circuit voltage phase, and send the main circuit voltage phase to the controller; and the controller is further configured to: when determining, based on the main circuit voltage phase, that a phase reversal occurs in the main power supply circuit, control the control switch to turn off.

7. The system according to claim 1, further comprising:
a standby power supply circuit detection circuit configured to: detect a standby circuit voltage of the standby power supply circuit, and send the detected standby circuit voltage to the controller; and wherein the controller is configured to: when determining, based on the standby circuit voltage, that overvoltage or undervoltage occurs in the standby power supply circuit, determine that the standby power supply circuit is abnormal, and control the control switch to turn on.

8. The system according to claim 7, wherein the power supply system is a three-phase alternating current power supply system and has no N wire, and the standby power supply circuit detection circuit is further configured to: when determining, based on the standby circuit voltage, that a phase loss occurs in the standby power supply circuit, send phase loss information of the standby power supply circuit to the controller; and the controller is configured to: determine, based on the phase loss information of the standby power supply circuit, that the standby power supply circuit is abnormal, and control the control switch to turn on.

9. The system according to claim 7, wherein the power supply system is a three-phase alternating current power supply system and has an N wire, and the standby power supply circuit detection circuit is further configured to: detect a standby circuit voltage phase of the standby power supply circuit, and send the standby circuit voltage phase to the controller; and the controller is further configured to: determine, based on the standby circuit voltage and the standby circuit voltage phase, that a phase loss occurs in the standby power supply circuit, and control the control switch to turn on.

10. The system according to claim 7, wherein the standby power supply circuit detection circuit is further configured to: obtain a standby circuit frequency based on the standby circuit voltage, and send the standby circuit frequency to the controller; and the controller is configured to: when determining, based on the standby circuit frequency, that a frequency exception occurs in the standby power supply circuit, control the control switch to turn on.

11. The system according to claim 7, wherein the standby power supply circuit detection circuit is further configured to obtain a standby circuit voltage phase, and send the standby circuit voltage phase to the controller; and the controller is further configured to: when determining, based on the standby circuit voltage phase, that a phase reversal occurs in the standby power supply circuit, control the control switch to turn on.

12. The system according to claim 1, further comprising:
an auxiliary power supply circuit configured to: obtain electricity from a path obtained by combining the main power supply circuit and the standby power supply circuit, and convert a voltage of the obtained electricity to supply power to the controller.

13. The system according to claim 1, further comprising:
a main circuit protection switch connected in series to the active power contactor, wherein a standby protection switch is connected in series to the standby power contactor.

14. The system according to claim 1, further comprising:
a backup capacitor configured to provide a backup power supply for the controller.

15. A control method of a power supply system, wherein the power supply system comprises an active power contactor, a standby power contactor, an auxiliary power contactor, a control switch, and a controller, the active power contactor is connected in series in a path of a main power supply circuit, the standby power contactor is connected in series in a path of a standby power supply circuit, the active power contactor and the standby power contactor are interlocked through the auxiliary power contactor, and the auxiliary power contactor is connected in series to the control switch, the method comprising:

when the main power supply circuit is abnormal, controlling the control switch to change a status of the auxiliary power contactor, to switch to the standby power supply circuit; and when the standby power supply circuit is abnormal, controlling the control switch to change the status of the auxiliary power contactor, to switch to the main power supply circuit;

wherein the auxiliary power contactor comprises a normally open contact and a normally closed contact, the normally open contact of the auxiliary power contactor and a normally closed contact of the standby power contactor are connected in series, the normally open contact of the auxiliary power contactor and a coil of the active power contactor are connected in series, the normally closed contact of the auxiliary power contactor and a normally closed contact of the active power contactor are connected in series, the normally closed contact of the auxiliary power contactor and a coil of the standby power contactor are connected in series, and the coil of the auxiliary power contactor is connected in series to the control switch;

the controlling the control switch to change the status of the auxiliary power contactor, to switch to the standby power supply circuit comprises:

controlling the control switch to turn off, so that the coil of the auxiliary power contactor is powered off, and switching to the standby power supply circuit, wherein the control switch is a normally closed switch; and the controlling the control switch to change a status of the auxiliary power contactor, to switch to the main power supply circuit comprises:

controlling the control switch to turn on, so that the coil of the auxiliary power contactor is powered on, and switching to the main power supply circuit.

16. The method according to claim 15, further comprising:

detecting a main circuit voltage of the main power supply circuit; and determining, based on the main circuit voltage, whether overvoltage, undervoltage, a phase loss, a phase reversal, or a frequency exception occurs in the main power supply circuit.

17. The method according to claim 15, further comprising:
- detecting a standby circuit voltage of the standby power supply circuit; and
- determining, based on the standby circuit voltage, whether overvoltage, undervoltage, a phase loss, a phase reversal, or a frequency exception occurs in the standby power supply circuit.

* * * * *